Oct. 24, 1950 R. H. WOLF 2,527,472
LAWN MOWER
Filed Jan. 18, 1945 2 Sheets-Sheet 1
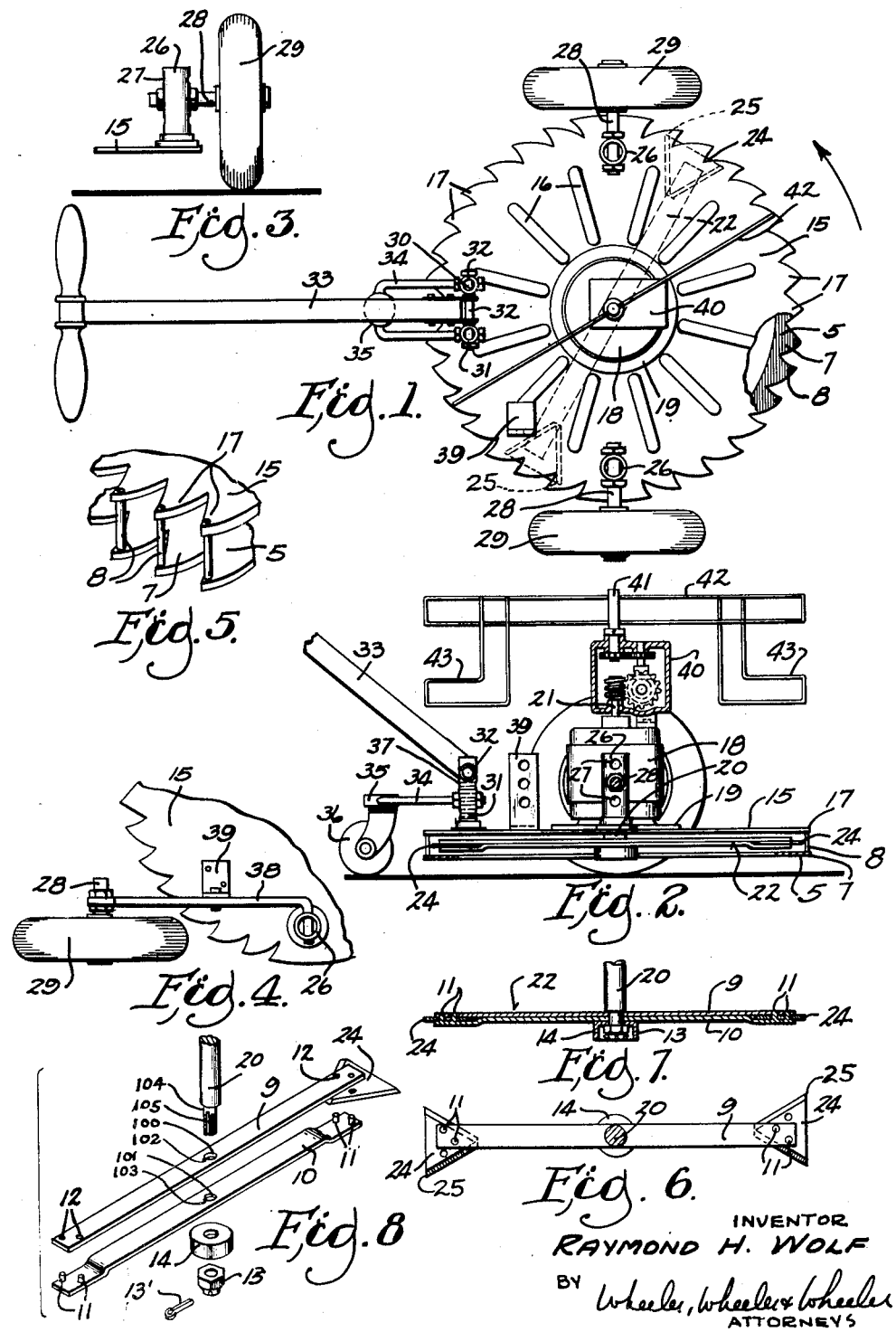
INVENTOR
RAYMOND H. WOLF
BY Wheeler, Wheeler & Wheeler
ATTORNEYS

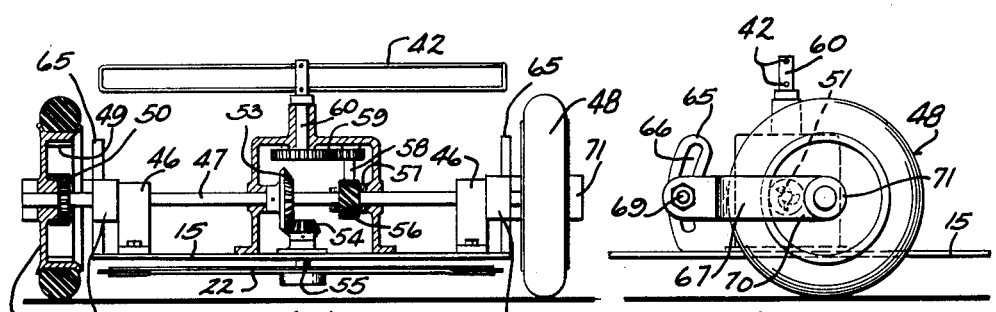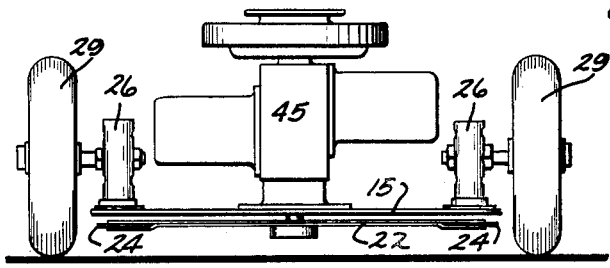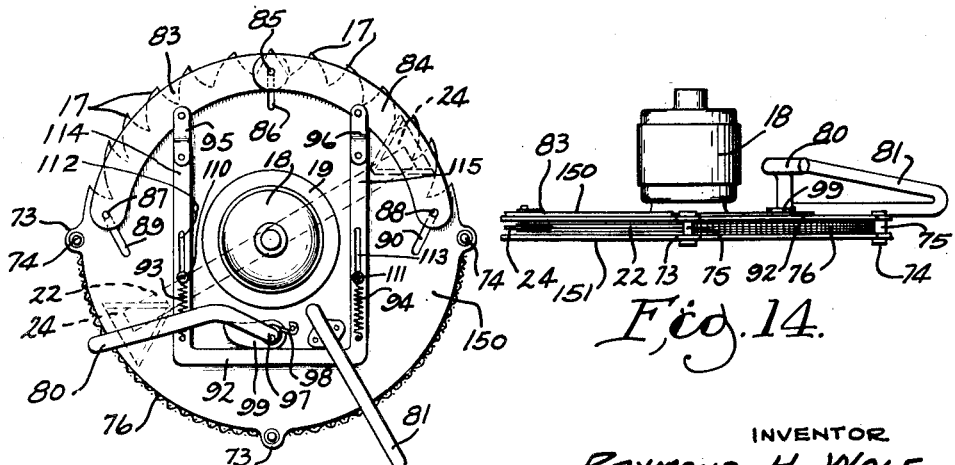

Patented Oct. 24, 1950

2,527,472

UNITED STATES PATENT OFFICE 2,527,472

LAWN MOWER

Raymond H. Wolf, Hubertus, Wis.

Application January 18, 1945, Serial No. 573,332

12 Claims. (Cl. 56—255)

This invention relates to improvements in mowers and the like for use in cutting or trimming grass, hedges, etc.

It is a primary object of the present invention to simplify and reduce the cost and weight of a mower and trimmer. Several features of the present invention contribute to this result, notably the fact that in my improved mower or trimmer construction a plate member serves the combined functions of a frame and guard.

For the protection of the operator and bystanders, it is a further object of the invention to provide my improved mower with cage means enclosing its cutting blade where desired and with a shutter-like device guards, when the mower is not in use, the notches into which the grass enters to be mowed. It is a further object to provide means whereby the shutter-like device is automatically retracted when the mower handle is held in position for use.

It is a further object of the invention to provide a novel and improved and simplified cutting blade assembly using conventional interchangeable mower blades which are available everywhere at low cost and enable replacement to be made inexpensively and with such ease that it becomes unnecessary to give any consideration to the sharpening of the blades.

Another object of the invention is to provide a device which can be used to cut grass of any desired height. While my improved mower is so simple and low in cost as to be well adapted for use even on small lawns, it is also very well adapted for use on country places where grass or weeds or grain up to several feet in height may have to be cut. My improved mower will handle any such cutting problem with ease and it is an object of the invention to provide simple means for windrowing the tall material cut.

For use in windrowing and also to enable my improved device to be used close to trees and flowerbeds, it is a further object of the invention to provide means by which one of its wheels can readily be shifted in position to lie behind the path of the cutter blades.

A further object of the invention is to provide an extremely light power-operated hedge trimmer incorporating some of the principles of the mower as above set forth and adapted to be supported and guided manually.

Other objects include the provision of alternative sources of power. Still other objects will be apparent to those skilled in the art upon analysis of the following disclosure of the invention.

In the drawings:

Fig. 1 is a plan view of a mower embodying the invention.

Fig. 2 is a view showing the apparatus of Fig. 1 partially in side elevation and partially in section.

Fig. 3 is a fragmentary detail view in rear elevation of a wheel mount.

Fig. 4 is a fragmentary plan view showing an alternative wheel mounting involving the use of an accessory support for the wheel.

Fig. 5 is a fragmentary detail view in perspective showing a preferred form of cage means which may be used if desired to enclose the cutting blades in the course of their rotation.

Fig. 6 is a detail view in plan of the cutter blades and their supporting arm.

Fig. 7 is a detail view taken in longitudinal section through the blade and arm assembly of Fig. 6.

Fig. 8 is a detail view showing in perspective the separated component parts of the blade-arm assembly.

Fig. 9 is a detail view in transverse section showing an arrangement whereby the cutter blades and the windrowing device may be manually operated instead of power operated.

Fig. 10 is a fragmentary detail in side elevation of portions of the apparatus shown in Fig. 9.

Fig. 11 is a fragmentary detail in plan of the part shown in Fig. 10.

Fig. 12 is a detail view in front elevation of a device embodying the invention which uses a gasoline engine as its prime mover.

Fig. 13 is a detail view in plan of a hedge trimming device embodying the invention.

Fig. 14 is a view in side elevation of the device shown in Fig. 13.

Like parts are identified by the same reference characters throughout the several views.

The guard plate 15 comprises the frame for the entire apparatus shown in all of the views. While it may optionally be provided with re-enforcing ribs as indicated at 16, it is nevertheless substantially planiform. It has teeth 17 on at least the front portion of its perimeter. These teeth project substantially radially only on the fore and aft center line of the disk 15. At either side of the center line, the teeth are curved so that their apices are inclined toward the center line as clearly shown in Fig. 1. These teeth have no shearing action. Their only function is to guide and support tall stems of grass or weeds pending the action of the cutter knives upon them in the manner hereinafter to be described In the preferred construction of the device, the teeth are provided both at the front and rear edges of the disk 15 so that the mower will operate when propelled either forwardly or rearwardly.

In many embodiments of the invention it is preferable to enclose in a skeletonized cage the rotary blades hereinafter to be described. For this purpose, I may employ beneath the disk 15 a ring 5 having corresponding teeth at 7 connected to the teeth 17 by means of vertical pins 8 welded or riveted to the teeth of the disk and the ring respectively, as best shown in Fig. 5.

Upon the disk 5 is mounted the prime mover which preferably comprises an electric motor 18 having any desired provision for electrical connections from a suitable source of electrical current. While any desired type of motor may be used, I prefer to employ a motor of the type in which the casing has an annular mounting flange at 19 about the armature shaft 20. It is further preferred that the motor be of the type known commercially as a double ended motor, the armature shaft having an upward extension at 21 for driving the windrowing device hereinafter to be described.

That portion of the armature shaft which extends through the mounting plate or disk 15, as shown in Fig. 2, carries an arm 22 disposed diametrically of the disk and immediately therebeneath. At its ends are mounted the generally triangular blades 24 which may be the conventional blades of a standard mowing machine, this type of blade being almost everywhere available at nominal cost. The outermost corners 25 of the respective blades move just within the guard teeth 17 of disk 15 and, in view of the high speed at which the arm 22 is preferably rotated, most of the cutting is done adjacent these outermost corners. As shown in Figs. 1 and 5, the blades are mounted to rotate counterclockwise.

In order to make the cutting blades 24 readily interchangeable, while at the same time securing them against the possibility of accidental loss, I prefer to mount them in the manner best shown in Figs. 6, 7 and 8.

The arm generally designated by reference character 22 comprises upper and lower bars 9 and 10, both of which are centrally apertured at 100 and 101 and key-slotted at 102 and 103, respectively to receive the reduced extremities 104 of shaft 20 and the key 105 carried thereby as shown in Fig. 8. The downwardly offset ends of bar 10 are provided with pins 11 for which registering apertures 12 are provided in the upper bar 9. These pins are so disposed as to be receivable through the openings in blades 24 and are of such length as to pass completely through the blades 24 and into the apertures 12 of bar 9.

The assembly is maintained by nut 13 preferably secured to the lower end of shaft 20 not only by its threads but by a cotter pin 13'. The nut and cotter pin may be protected from direct contact with the grass by a protective cup 14, if desired. Removal of the cotter pin and the unscrewing of the single nut 13 will release the entire assembly for a change of blades. Yet the blades are securely anchored.

The disk 15 is provided at its sides with upstanding posts 26 which, in actual practice, have been made tubular. These posts have openings through them at 27 at different levels to receive interchangeably the stud shafts 28 upon which are mounted the wheels 29 at either side of the disk. One further adjustment is possible in each direction from the position of the stud shafts shown in Figs. 2 and 3.

Near the rear of the disk 15, I have provided a combination caster wheel and handle mounting which comprises the posts 30 and 31. The cross bar 32 between these posts affords a fulcrum for the handle 33 while the U-bolt 34 connected at its ends to selected apertures 37 in the respective posts carries at 35 a socket for the trailing caster wheel 36.

Where it is desired to work very close to a soil bed or tree or to other trimming work, I may remove one of the side wheels 29 from its direct mounting on post 26 and may substitute in post 26 an elbowed attachment 38 bolted at a point intermediate of its length to a bracket 39 on disk 15 (Fig. 4). The rear end of the attachment 38 provides an aperture for the stud shaft 28 of the wheel to carry the wheel in a position in which it is within the swath cut by the knives, thus making it possible to operate the mower with its guard plate and frame disk 15 in immediate proximity to the flowerbed or tree about which trimming is to be done.

For operating on extremely tall grass or weeds, it is desirable to throw all of the cut material at one side of the path of the device in a windrow which will not interfere with a succeeding swath. For this purpose, I mount the gear reducer 40 on top of the motor 18 as best shown in Figs. 1 and 2. The set of reducing gearing within the reducer 40 delivers relatively slow motion to its upwardly projecting output shaft 41. Upon this shaft, I mount a wire frame at 42, preferably having depending arms 43. The output shaft 41 of the reducer 40 is substantially coaxial with the armature shaft 20 of the motor and the radius of the windrowing arms 42, 43 is substantially that of the disk 15. Thus, as the windrowing device is relatively slowly rotated, it will displace to the left of the path of advance of the mower the material which is cut at the forward side of disk 15, depositing such material in a windrow at the left of the swath cut. With such an arrangement, the mower will be so operated that the windrow is formed on a previous swath, thereby being moved from interference with the cutting of the next swath.

In the construction thus far described, the prime mover comprises an electric motor which drives the cutting blades and the windrowing device only, the mower being hand propelled. In the construction shown in Fig. 12 an internal combustion engine 45 is the prime mover and the windrowing device is omitted. The construction otherwise may be identical with that already disclosed.

In the construction shown in Figs. 9 to 11 inclusive, the manual propulsion of the mower provides the power for operating the knives and the windrowing device. A special adjustment for the mounting of the wheels is substituted for that previously described because of the connection necessary from the wheels to the gears.

At each side of the combination guard and frame disk 15 are the standards 46 which provide bearings for the drive shaft 47. The wheels 48 are provided with internal gear teeth 49 in the usual manner to drive the pinions 50 which, through the conventional dogs illustrated in dotted lines at 51 in Fig. 10, operate shaft 47. The shaft 47 has a bevel gear at 53 meshing with a smaller gear 54 on the vertical shaft 55 on which the cutter arm 22 is mounted. It also carries a spiral beveled pinion 56 meshing with pinion 57 to drive shaft 58 which, in turn, is connected by gearing at 59 with shaft 60 on which the windrowing device 42 is mounted.

Each of the standards 46 in which the drive shaft 47 has its bearings has a rearwardly extending arm at 65 provided with an arcuate slot 66 concentric with the axis of shaft 47. The wheel bracket 67 has a bearing at 68 on shaft 47 about which the entire bracket is pivotally movable. At its rear end a bolt 69 operating in the slot 66 holds the wheel bracket in adjustment. The arm 70 extending about the outside of the wheel is provided with a bearing at 71 for the wheel. Since this bearing is located somewhat forwardly of the mounting bearing 68 for the bracket, it will be apparent that when the rear end of the bracket is adjusted upwardly and clamped by bolt 69 the wheel will be lowered with respect to the combination frame and guard disk 15. Thus provision is made for raising and lowering the wheel with respect to the disk 15 without in any manner interfering with the geared connection of the wheel gear teeth 49 with pinion 50 on the shaft 47.

In the construction shown in Figs. 13 and 14, the guard disk and frame plate 150 has the guiding and supporting teeth 17 at its front peripheral portion only. Beneath it is another guard plate or ring 151 of identical outline. The respective plates have projecting ears at 73 connected by bolts 74 and spaced by collars 75 on the respective bolts. The entire gap about the plates between their rear peripheral margins is closed by a guard 76. As in the construction shown in Figs. 1 and 2, the prime mover is preferably an electric motor 18 mounted on plate 150 by means of the mounting flange 19. The arm 22 and cutting blades 24 may be mounted on armature shaft 20 in any desired manner.

A pair of handles 80, 81 connected with the frame plate 150 and preferably set at substantially radial angles to be mutually divergent as shown in Fig. 13 are used for supporting and guiding the apparatus in trimming. The device as shown may be used for any trimming purpose to operate on grass, weeds or twigs, but is particularly designed to cut twigs, as in hedge trimming.

I have shown in Figs. 13 and 14 a shutter device which is opened automatically when the tool is in use and is normally closed to prevent children or other curious persons from inserting their fingers between the teeth 17 into the path of the blades. It will, of course, be understood that similar shutter arrangements may be used on any of the various embodiments of the invention. In the form in which the shutter arrangement is illustrated in Figs. 13 and 14, it comprises a pair of arcuate segments 83, 84, pivoted at 85 upon a guide pin which is reciprocable upon a slot 86 provided by plate 150. At their rear ends the respective segments have similar pins 87, 88, guided in obliquely disposed slots 89, 90 respectively.

The U-shaped bar 92 is normally drawn forwardly by tension springs at 93, 94, which are fixed at one end on posts 110 and 111 mounted on the plate 150 and projecting through slots 112 and 113 in the legs 114 and 115 of the bar 92. The other ends of the springs are attached near the base of the legs so as to bias the bar into contact with cam 99. The bar legs have their forward ends connected by links 95, 96, with the respective segments 83, 84. The handle 80, instead of being made fast to the combination guard and frame plate 150, is pivoted thereto at 97 and biased in a clockwise direction of oscillation by torsion spring 98. A cam 99 connected with the handle 80 bears on the U-shaped frame 92 which acts as a cam follower to transmit motion to the shutter segments 83, 84 against the bias of springs 93, 94, to retract the shutter segments from their normal position overlying teeth 17 whenever the handle 80 is oscillated in a counter-clockwise direction, as will normally be the case when the tool is lifted for use.

Thus, as the operator grasps the tool and moves the handle to position for use, he automatically, without any conscious direction on his part, retracts the shutter segments, leaving the teeth exposed. At all other times, as for example when the apparatus is stored, the spaces between the teeth will be covered by the shutter segments against access by inquisitive fingers.

In all forms of the apparatus as herein disclosed, a substantially planiform plate, preferably of substantially circular outline, is not only the frame of the device which connects the supporting and guiding means and the prime mover, but is also provided with guiding and supporting teeth, being thereby adapted to guide to the path of the blades the material to be cut, while serving as a guard for the protection of the operator. I have shown my improved mower and trimmer both with and without the windrowing device and with various forms of motive power.

I have also shown my improved mower and trimmer with and without casing means enclosing the blades and with and without the retractible shutter-like guard segments. It will, of course, be understood that all of the several features herein disclosed are interchangeably adapted for use in the various embodiments, it being contemplated that any mower or trimming device embodying this invention may have or omit the protecting cage or the windrowing device, or the retractible shutter segments, or any other features herein disclosed.

I have also shown how the supporting wheel with which the device illustrated in Figs. 1 and 2 is normally provided at its side may be optionally re-positioned by means of an attachment to permit the mower to operate in immediate proximity to any obstacle.

In all of my constructions, I have disclosed an arrangement in which a novel disposition and mounting is provided for a conventional triangular tooth which is interchangeably placed with its apex toward the axis of rotation. When one cutting edge of such a blade becomes dulled, the blade may be inverted or replaced without difficulty.

I claim:

1. In a mower, the combination with an arm mounted for rotation and provided with a cutting blade and means for driving the arm, of supporting and guiding means and a plate constituting a frame to which said arm operating means and said supporting and guiding means are directly connected, said plate also constituting a guard having an area such as substantially to cover the path of movement of said blade, said plate being provided peripherally, at least in the portion thereof which extends forwardly in the direction of mower travel, with pointed teeth, the apices of which project forwardly in the direction of travel, and intervening notches to admit to the path of said blade material to be cut thereby.

2. The device set forth in claim 1, in further combination with shutter-like means removably applied to said plate across the notches and supported on the intervening teeth.

3. In a mower, the combination with an arm mounted for rotation and provided with a cutting blade and means for driving the arm, of supporting and guiding means and a plate constituting a frame to which said arm operating means and said supporting and guiding means are directly connected, said plate also constituting a guard having an area such as substantially to cover the path of movement of said blade, said plate being provided peripherally, at least in the portion thereof which extends forwardly in the direction of mower travel, with pointed teeth, the apices of which project forwardly in the direction of travel, and intervening notches to admit to the path of said blade material to be cut thereby, in further combination with shutter-like means removably applied to said plate across the notched portion thereof, together with a handle connected with the plate and movable thereon between operative and retracted positions, means guiding said shutter means for movement from the notched portion of the plate, and motion transmitting connections from the handle to the shutter means for retracting the shutter means from the notched portion of the plate in the course of handle movement from its inoperative position.

4. A device of the character described comprising the combination with an upright shaft and blade means connected therewith to rotate substantially horizontally, of a guard having a notched periphery disposed above the path of said blade means and projecting at least to the same radius, the notches affording access of material to the blade means to be cut thereby, a prime mover in operative connection with said shaft, and a windrowing device rotatable in a horizontal plane above said guard means and adapted to sweep transversely over the notched periphery thereof for delivering at one side of the guard means tall material severed by said blade, said windrowing device comprising an arm mounted for rotation and provided with means affording operative driving connections from said prime mover.

5. In a device of the character described, the combination with a plate-like frame having a prime mover centrally mounted upon it and provided with a downwardly extending shaft, a rotary sickle mounted on said shaft immediately beneath said plate-like frame, and a pair of upstanding posts at opposite sides of the frame and within the frame margin and provided with correspondingly spaced transverse apertures at a plurality of levels, wheel spindles above the level of the frame and extending across the frame margin adjustably connected in the apertures of the posts and interchangeable between such apertures, and wheels for supporting said frame rotatably mounted on the spindles.

6. In a device of the character described, the combination with a frame, of a pair of spaced posts adjacent the rear thereof, said posts having a plurality of correspondingly spaced transverse apertures, a U-bolt having legs adjustably engaged in selected apertures of the respective posts to extend the central portion of the U-bolt past the rear margin of the frame, a swivel fitting centrally connected with the U-bolt, and a caster wheel supported by said swivel fitting past the rear margin of the frame, together with a pintle bolt spanning said post above said frame, and a handle pivoted to the pintle bolt.

7. In a device of the character described, the combination with a supporting frame and a rotary sickle blade therebeneath, of a transversely apertured post at one side of the frame and within the margin thereof, a bracket connected to the frame behind the post, an arm connected in the aperture of the post and projecting rearwardly from the bracket across the frame margin and provided with an aperture past the frame margin, and a wheel spindle interchangeably receivable in the aperture of the post and the aperture of said arm and provided with a wheel for supporting said frame, the position of said wheel when supported by said arm being within the path traveled by the frame and swept by said blade.

8. A device of the character described comprising upper and lower guard plates having correspondingly notched marginal portions, means peripherally connecting the plates in spaced relation, a rotary sickle mounted to sweep between said plates across the registering notches thereof and within the peripheral connecting means, both of said plates having tooth portions extending beyond the path of the sickle in the direction of forward travel of the mower, a prime mover mounted on the uppermost of said plates, and supporting and guiding means connected with said plates, at least one of said plates comprising not only a guard but a frame member for connecting the prime mover and the supporting and guiding means.

9. The device of claim 8, in which the respective plates have a plurality of corresponding tooth portions aforesaid provided with interconnecting means beyond the path of the sickle and forwardly thereof.

10. In a mower, the combination with mowing means and a transverse drive shaft having motion transmitting connection therewith, of a pinion on the drive shaft, a supporting wheel having an internal gear with which the pinion meshes, and a bracket for said wheel oscillatable coaxially with the drive shaft and provided at one side of the drive shaft with a bearing for said wheel, said bracket being provided with means for fixing its oscillatory adjustment whereby to position the height of the wheel respecting the drive shaft while maintaining operative mesh between the pinion and the internal gear of the wheel.

11. The device of claim 10, in which said bracket is provided with a bearing on said drive shaft for its oscillatory support at the inside of the wheel and has an arm extending outside of the wheel connected with the wheel bearing and upon which the wheel is mounted for rotation.

12. In a mower, the combination with a rotary sickle, of a pair of notched plates disposed at opposite sides of the path of the sickle and having corresponding notches and corresponding teeth, including many teeth projecting forwardly of the sickle in the direction of mower travel, certain of said teeth being provided with corresponding apices, and pins connecting the apices of the corresponding teeth whereby to provide a cage within which said sickle is operable and into which such notches afford access to the path of the sickle.

RAYMOND H. WOLF.

(References on following page)

REFERENCES CITED

The following references are of record in the file of this patent:

UNITED STATES PATENTS

| Number | Name | Date |
|---|---|---|
| 876,637 | Hare et al. | Jan. 14, 1908 |
| 1,323,498 | Scranton | Dec. 2, 1919 |
| 1,336,257 | Muzzy | Apr. 6, 1920 |
| 1,871,606 | Haddad | Aug. 16, 1932 |
| 2,058,353 | Randolph | Oct. 20, 1936 |
| 2,149,463 | Orr | Mar. 7, 1939 |
| 2,165,551 | Iverson | July 11, 1939 |
| 2,167,222 | Shelor | July 25, 1939 |
| 2,281,639 | Swan | May 5, 1942 |
| 2,287,126 | Packwood | June 23, 1942 |
| 2,308,076 | Hainke | Jan. 12, 1943 |
| 2,312,972 | Orr | Mar. 2, 1943 |
| 2,318,430 | Spahn | May 4, 1943 |